United States Patent
Fujita et al.

(10) Patent No.: US 9,230,567 B1
(45) Date of Patent: Jan. 5, 2016

(54) SPIN TORQUE OSCILLATOR, MICROWAVE-ASSISTED MAGNETIC RECORDING HEAD, MAGNETIC RECORDING HEAD ASSEMBLY, AND MAGNETIC RECORDING AND RESUMING DEVICE

(71) Applicant: Kabushiki Kaisha Toshiba, Minato-ku, Tokyo (JP)

(72) Inventors: Norihito Fujita, Yokohama Kanagawa (JP); Katsuhiko Koui, Yokohama Kanagawa (JP); Satoshi Shirotori, Yokohama Kanagawa (JP); Mariko Shimizu, Kawasaki Kanagawa (JP); Shuichi Murakami, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 14/812,312

(22) Filed: Jul. 29, 2015

(30) Foreign Application Priority Data

Apr. 20, 2015 (JP) ................................. 2015-086096

(51) Int. Cl.
*G11B 5/127* (2006.01)

(52) U.S. Cl.
CPC ..................................... *G11B 5/127* (2013.01)

(58) Field of Classification Search
CPC ........... G11B 5/127; G11B 5/33; G11B 5/147

USPC ............... 360/125.3, 125.03, 125.09, 125.04, 360/125.17, 125.12, 125.06, 125.15, 360/125.26, 125.19, 39
See application file for complete search history.

(56) References Cited

U.S. PATENT DOCUMENTS

| 2011/0205655 | A1* | 8/2011 | Shimizu | G11B 5/02 360/39 |
|---|---|---|---|---|
| 2013/0050875 | A1 | 2/2013 | Yamada et al. | |
| 2013/0222941 | A1 | 8/2013 | Sugiura et al. | |
| 2014/0085753 | A1 | 3/2014 | Nagasaka et al. | |
| 2015/0043106 | A1* | 2/2015 | Yamada | G11B 5/1278 360/123.05 |
| 2015/0092301 | A1* | 4/2015 | Fujita | G11C 5/23 360/123.05 |

FOREIGN PATENT DOCUMENTS

JP          2010-040126 A       2/2010

* cited by examiner

*Primary Examiner* — Allen T Cao
(74) *Attorney, Agent, or Firm* — White & Case LLP

(57) ABSTRACT

According to one embodiment, a microwave-assisted magnetic recording head includes a SIL formed either in an area outside a FGL in a track width direction or in an area outside a FGL in a depth direction perpendicular to an air bearing surface of the FGL. An area between the SIL and the FGL can be enlarged, and an intermediate layer can be formed therebetween such that an area in which the intermediate layer contacts the FGL can be enlarged as well.

4 Claims, 7 Drawing Sheets

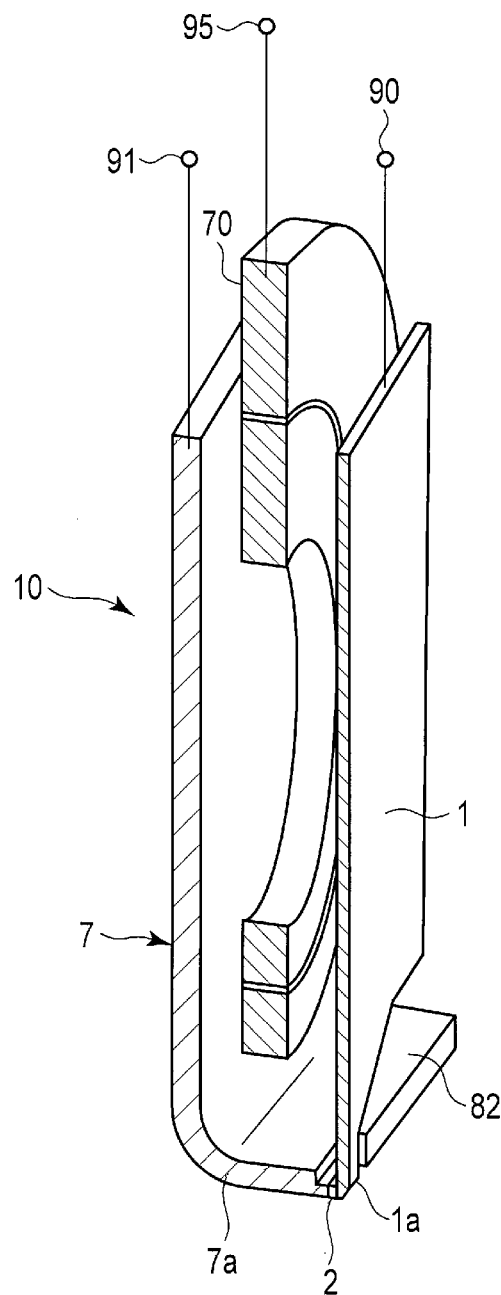
F I G. 1

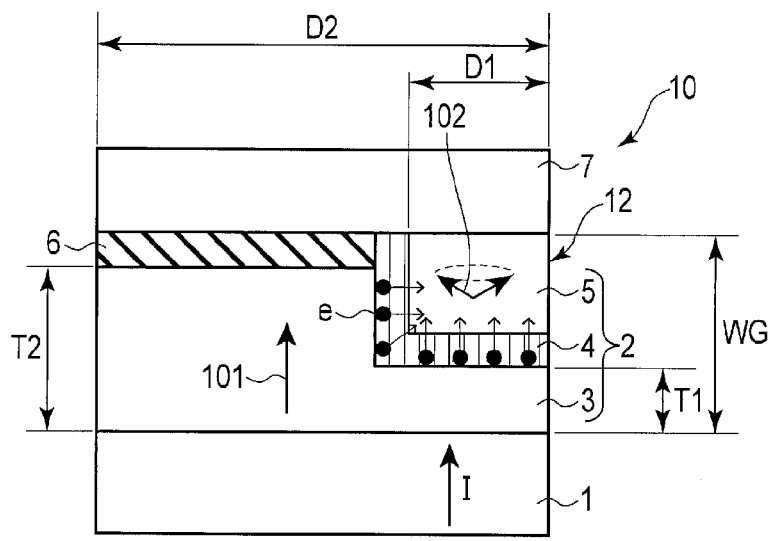
F I G. 2
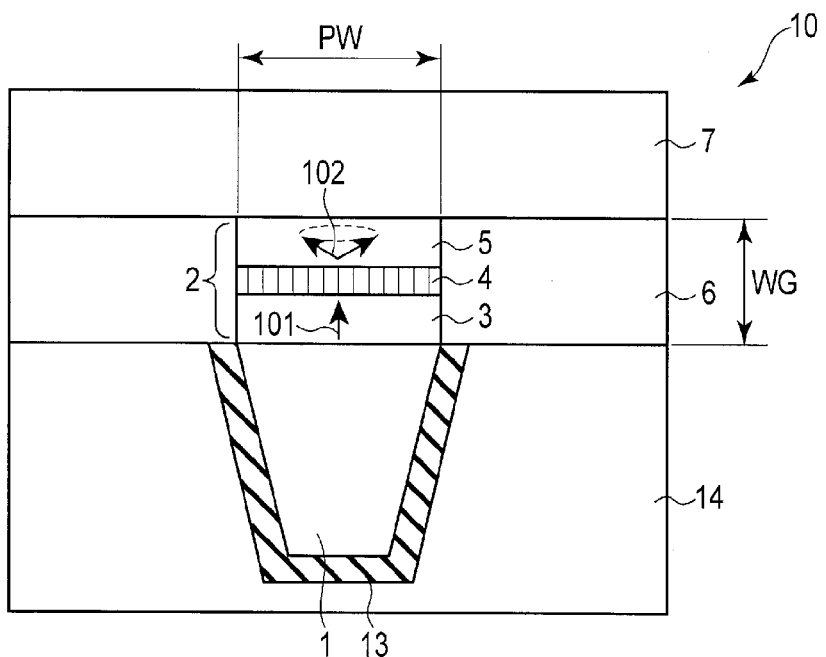
F I G. 3

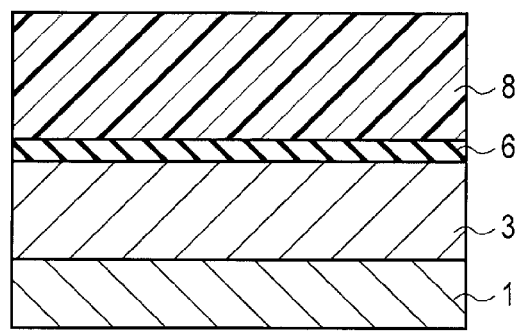
F I G. 4A
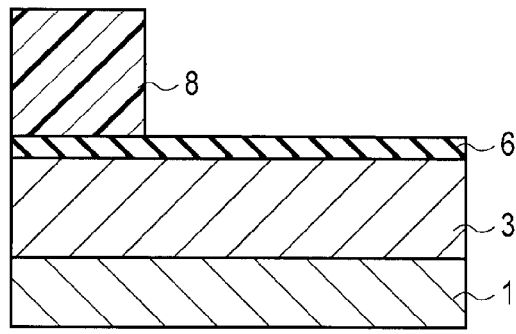
F I G. 4B
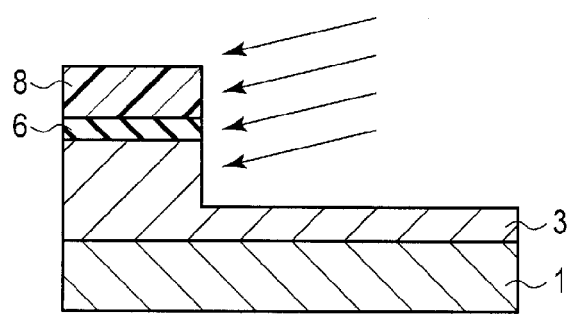
F I G. 4C

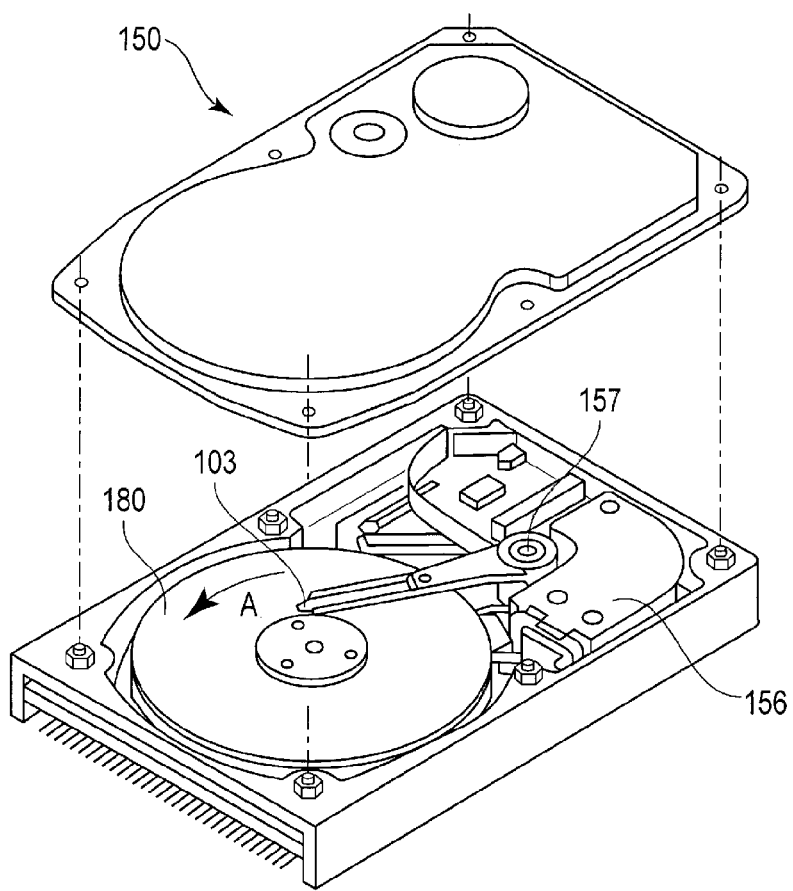
F I G. 7
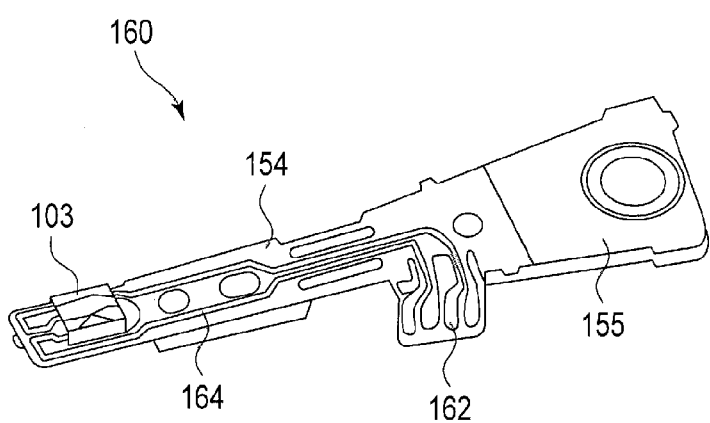
F I G. 8

SPIN TORQUE OSCILLATOR, MICROWAVE-ASSISTED MAGNETIC RECORDING HEAD, MAGNETIC RECORDING HEAD ASSEMBLY, AND MAGNETIC RECORDING AND RESUMING DEVICE

CROSS-REFERENCE TO RELATED APPLICATIONS

This application is based upon and claims the benefit of priority from Japanese Patent Application No. 2015-086096, filed Apr. 20, 2015, the entire contents of which are incorporated herein by reference.

FIELD

Embodiments described herein relate generally to a spin torque oscillator, microwave-assisted magnetic recording head, microwave magnetic recording head assembly, and magnetic recording and resuming device.

BACKGROUND

Disk devices such as a magnetic disk device include, for example, a magnetic disk provided inside a case, spindle motor which supports and rotates the magnetic disk, magnetic head which reads/writes data from/to the magnetic disk, and carriage assembly which supports the magnetic head movably with respect to the magnetic disk. The magnetic head includes a head part composed of a magnetic recording head used for write and a resuming head used for read.

In recent years, perpendicular magnetic recording heads are proposed for increasing recording density, capacity, and miniaturization of the magnetic disk device. In such magnetic heads, a recording head includes a main magnetic pole which produces a perpendicular magnetic field, write shield disposed to face the main magnetic pole with a write gap interposed therebetween at a trailing side of the main magnetic pole to close a magnetic path with the magnetic disk, and coil to supply a magnetic flux to the main magnetic pole.

There are proposed microwave-assisted magnetic recording heads in which a spin torque oscillator arranged between the main magnetic pole and the write shield (arranged in the write gap). The spin torque oscillator (STO) is formed as a layered structure of a field generation layer (FGL), intermediate layer, and spin injection layer face (SIL), and the spin torque oscillator is electrically connected to the main magnetic pole and the write shield. The intermediate layer functions to send spin current from the spin injection layer (SIL) to the field generation layer (FGL); however, the conventional layered structure does not sufficiently inject the polarized spin into the field generation layer (FGL), and when bias current increases, the magnetization of the spin injection layer (SIL) tends to fluctuate by the spin transfer torque from the field generation layer (FGL).

BRIEF DESCRIPTION OF THE DRAWINGS

FIG. 1 is a perspective view which schematically shows a microwave-assisted magnetic recording head of an embodiment, being cut along a tracking center of a magnetic disk.

FIG. 2 shows proximity to an ABS of the recording head being viewed vertically with respect to the cut surface in FIG. 1.

FIG. 3 shows FIG. 2 being viewed from the ABS.

FIGS. 4A, 4B, 4C, 4D, 4E, 4F, 4G, 4H, and 4I show a manufacturing process of a spin torque oscillator of the embodiment.

FIG. 7 is a perspective view which schematically shows main parts of a magnetic recording and resuming device of the embodiment.

FIG. 8 schematically shows an example of a magnetic head assembly of the embodiment.

DETAILED DESCRIPTION

Figure 4D:
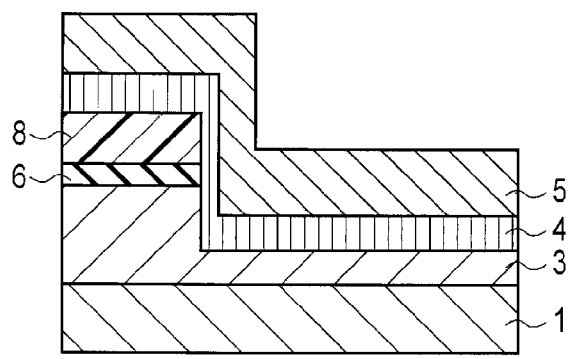

In general, according to one embodiment, a spin torque oscillator comprises a spin injection layer (SIL) having a first side surface, an intermediate layer having a second side surface formed to be flush with the first side surface, and a field generation layer (FGL) formed on the intermediate layer and having a third side surface formed to be flush with the first side surface.

In a first embodiment, a width of the first side surface of the spin injection layer (SIL) in a film surface direction is greater than a width of the third side surface of the field generation layer (FGL) in the film surface direction, and the spin injection layer (SIL) is at least partially disposed in an area outside the third side surface of the field generation layer (FGL) in the film surface direction with the intermediate layer interposed therebetween.

In a second embodiment, a depth of the spin injection layer (SIL) in a direction perpendicular to the first side surface is greater than a depth of a field generation layer (FGL) in a direction perpendicular to the third surface, and the spin injection layer (SIL) is at least partially disposed in an area outside the third side surface of the field generation layer (FGL) in the direction perpendicular thereto with an intermediate layer interposed therebetween.

In a third embodiment, the spin injection layer (SIL) has both the feature of the first embodiment and the feature of the second embodiment.

A microwave-assisted magnetic recording head of an embodiment comprises a main magnetic pole which supplies a magnetic recording field to a magnetic recording medium, an auxiliary magnetic pole which forms a magnetic circuit in conjunction with the main magnetic pole, and a spin torque oscillator provided between the main magnetic pole and the auxiliary magnetic pole. The spin torque oscillator includes the spin injection layer (SIL) formed on either the main magnetic pole or the auxiliary magnetic pole, the intermediate layer formed on the spin injection layer (SIL), and the field generation layer (FGL) formed on the intermediate layer.

In a fourth embodiment, a width of the spin injection layer (SIL) in a direction perpendicular to a write gap of an air bearing surface (ABS) is greater than a width of the field generation layer (FGL) in a direction perpendicular to a write gap of an air bearing surface, and the spin injection layer (SIL) is at least partially disposed in an area outside the field generation layer (FGL) in a track width direction with the intermediate layer interposed therebetween while being insulated from the auxiliary magnetic pole.

In a fifth embodiment, a depth of the spin injection layer (SIL) in a direction perpendicular to an air bearing surface is greater than a depth of the field generation layer (FGL) in a direction perpendicular to an air bearing surface, and the spin injection layer (SIL) is at least partially disposed in an area outside the field generation layer (FGL) in the depth direction perpendicular to the air bearing surface with the intermediate layer interposed therebetween while being insulated from the auxiliary magnetic pole.

In a sixth embodiment, a spin injection layer (SIL) has both the feature of the fourth embodiment and the feature of the fifth embodiment.

In an embodiment, the spin injection layer (SIL) is formed outside the field generation layer (FGL) in a track width direction, or is formed outside the field generation layer (FGL) in a depth direction perpendicular to an air bearing surface in such a manner that an area between the spin injection layer (SIL) and the field generation layer (FGL) can be enlarged. Consequently, an intermediate layer which functions to pass polarized electrons from the spin injection layer (SIL) to the field generation layer (FGL) can be formed with a larger area. If the area of the intermediate layer contacting the field generation layer (FGL) becomes larger, the polarized electrons injected into the field generation layer (FGL) become greater. Therefore, the greater spin transfer torque is applied to the field generation layer (FGL) and rotation angle of magnetization of the field generation layer (FGL) increases resulting in a greater microwave magnetic field. Furthermore, if the volume of the spin injection layer (SIL) is greater than that of the field generation layer (FGL), fluctuation in magnetization of the spin injection layer (SIL) caused by the spin transfer torque from the field generation layer (FGL) to the spin injection layer (SIL) can be suppressed, and polarized electrons can be constantly injected into the field generation layer (FGL).

A magnetic head assembly of another embodiment comprises one of the microwave-assisted magnetic recording heads of the fourth to sixth embodiments, a head slider on which the microwave-assisted magnetic recording head is mounted, a suspension of which one end includes a head slider, and an actuator arm connected to the other end of the suspension.

Furthermore, a magnetic recording and resuming device of another embodiment comprises a magnetic recording medium, a driver which drives the magnetic recording medium, and one of the microwave-assisted magnetic recording heads of the fourth to sixth embodiments configured to perform data processing to the magnetic recording medium.

Hereinafter, embodiments will be described with reference to accompanying drawings.

FIG. 1 schematically shows a recording head cut along a tracking center of a magnetic disk.

In the example depicted, main magnetic pole 1 extends substantially perpendicularly to the surface of the magnetic disk and air bearing surface (ABS) which are not shown. A tip 1a at the magnetic disk side of the main magnetic pole 1 is tapered toward the ABS and is shaped as a pillar narrowed with respect to the other part of the main magnetic pole 1. The tip surface of the main magnetic pole 1 is exposed to an ABS of a slider which is not shown. A connector 90 is connected to a trailing shield 7 and a power source is connected to the connector 90.

A trailing shield 7 is substantially L-shaped and has a tip 7a opposed to the tip 1a of the main magnetic pole 1. The tip 7a of the trailing shield 7 is formed in a slender rectangular shape. The tip surface of the trailing shield 7 is exposed to the ABS of the slider which is not shown. A connector 91 is connected to the trailing shield 7 and the power source is connected to the connector 91.

In the present embodiment, a recording head 10 has a side shield 82 which is physically separated from the main magnetic pole 1 at its both track width direction sides but is connected to the trailing shield 7. In the present embodiment, the side shield 82 is formed integrally with the trailing shield 7.

A recording coil 70 is provided between the main magnetic pole 1 and the trailing shield 7, for example. A connector 95 is connected to the recording coil 70 and the power source is connected to the connector 95. Current supplied from the power source to the recording coil 70 is under the control of an HDD control unit. During signal writing to a magnetic disk 12, predetermined current is supplied from the power source to the recording coil 70 and a magnetic field is produced by the magnetic flux flowing to the main magnetic pole 1.

A spin torque oscillator 2 is provided inside a write gap WG between the tip 1a of the main magnetic pole 1 and the tip 7a of the trailing shield 7.

FIG. 2 shows the proximity of the ABS of the recording head being viewed vertically with respect to the cut surface in FIG. 1. As in FIG. 2, a microwave-assisted magnetic recording head 10 has a structure in which the spin torque oscillator 2 and the trailing shield 7 are layered in this order on the main magnetic pole 1. At each side of the main magnetic pole 1, a side shield 14 formed of a single substance of Fe, Co, or Ni, or an alloy containing at least two of Fe, Co, and Ni is provided with an insulating layer 13 interposed between.

FIG. 3 shows the structure of FIG. 2 from the ABS side.

The spin torque oscillator 2 can be formed on, for example, an AlTiC substrate including a resuming head, which is not shown. The main magnetic pole 1 can be formed on the AlTiC substrate.

The spin torque oscillator 2 is an example of the spin torque oscillator structure of the first embodiment, and includes an underlying layer (not shown), spin injection layer (SIL) 3, intermediate layer 4, field generation layer (FGL) 5, and a cap layer (not shown) layered in this order in the direction of the write gap WG. The spin injection layer (SIL) 3 has a depth D2 perpendicular to a air bearing surface of the spin injection layer (SIL) 3, and the depth D2 is greater than depth D1 perpendicular to a air bearing surface of the field generation layer (FGL) 5. Furthermore, the spin injection layer (SIL) 3 is at least partially extends to an area projecting in the direction perpendicular to the air bearing surface of the field generation layer (FGL) 5 via the intermediate layer 4. Furthermore, the spin injection layer (SIL) 3 is insulated from an auxiliary pole 7 by an insulating layer 6.

The main magnetic pole 1 is formed of a single substance of Fe, Co, or Ni, or of an alloy containing at least two of Fe, Co, and Ni through plating or sputtering.

The upper surface of the main magnetic pole 1 is flattened by chemical mechanical polishing (CMP) and the spin torque oscillator 2 is formed on the main magnetic pole 1.

The underlying layer can be used to improve smoothness and crystallization, and can be formed of a material of good wettability such as Ta, Ti, and Cr, or a material of low electric resistance such as Cu, Au, Ag, and Pt, or a layered structure of these materials.

The spin injection layer (SIL) 3 can be a perpendicular magnetic film represented by a CoCr alloy such as CoCrPt, CoCrTa, CoCrTaPt, and CoCrTaNb, RE-TM amorphous alloy such as TbFeCo and GdFeCo, artificial lattice such as FeCo/Ni, CoFe/Ni, Co/Ni, Co/Pt, Co/Pd, and Fe/Pt, FePt, FePd, CoPt, and CoPd alloy, and SmCo alloy.

As to the spin injection layer (SIL) 3, a film thickness T1 may be set to 5 to 20 nm in the layering direction of, for example, the intermediate layer 4 and the field generation layer (FGL) 5 in the proximity of the ABS 12. Furthermore, a film thickness T2 of the spin injection layer (SIL) may be set to 15 to 45 nm in the write gap direction of the main magnetic pole 1 in the area outside the outline of the field generation layer (FGL) 5 in the depth direction perpendicular to the ABS 12 in consideration of the film thickness in the write gap direction of each of the intermediate layer 4 and field generation layer (FGL) 5. Furthermore, a depth D2 of the spin injection layer (SIL) 3 may be set to 50 to 150 nm in the direction perpendicular to the air bearing surface. The spin injection layer (SIL) 3 can possess such a volume that the perpendicular magnetization does not fluctuate by the spin transfer torque from the field generation layer (FGL) 5. For example, the spin injection layer (SIL) may be five to ten times larger than the field generation layer (FGL) 5 in volume.

The intermediate layer 4 may be formed of a material having a long spin dispersion length in order to send a spin flow from the spin injection layer (SIL) 3 to the field generation layer (FGL) 5. The intermediate layer 4 may be formed of a material such as Cu, Ag, Au, and Al, or a layered structure or an alloy of these elements.

The field generation layer (FGL) 5 may be formed of a single substance of Fe, Co, or Ni, or an alloy containing at least two of Fe, Co, and Ni, namely, FeCo, FeNi, or the like. Furthermore, the field generation layer (FGL) 5 may be formed as a soft magnetic layer having relatively large saturated magnetic flux density and having magnetic anisotropy in a film inward direction such as FeCoAl, CoFe, CoNiFe, NiFe, CoZrNb, FeN, FeSi, FeAlSi, FeCoAl, FeCoSi, and CoFeB. The field generation layer (FGL) 5 may be formed of a CoCr magnetic alloy film in which magnetization is oriented in a film inward direction, namely, CoIr or the like. Furthermore, in order to adjust the saturated magnetization and anisotropic magnetic field, a layered structure in which above materials are layered may be used. For example, the field generation layer (FGL) 5 may be formed of a high Bs soft magnetic material (FeCo/Ni layered film). Furthermore, a depth D1 of the field generation layer (FGL) 5 may be set to 10 to 50 nm in the direction perpendicular to the air bearing surface.

The cap layer can be used to protect the spin torque oscillator 2, and can be formed of a material of good wettability such as Ta, Ti, Cr, Ru, and W, or a material of low electric resistance such as Cu, Au, and Ag, or a layered structure of these materials.

The trailing shield may be formed of an alloy containing Fe, Co, Ni, and the like and formed through plating, sputtering, or the like.

FIGS. 4A to 4I individually show a manufacturing process of the spin torque oscillator of the embodiments.

FIGS. 4A to 4I individually show a cut surface of the ABS using the main magnetic pole as the center of cutting, as being viewed perpendicularly.

Firstly, as shown in FIG. 4A, the spin injection layer (SIL) 3 and the insulating layer 6 are formed on the main magnetic pole 1, and a mask 8 is formed on the insulating layer 6 for photolithographic patterning. The mask may be a photoresist. The photoresist is formed by spin coating or the like. Alternately, the mask may be a hardmask formed of a material having high resistivity to an ion milling process, namely, C, Si, Ta, Cr, W, Mo, and the like.

Secondly, as shown in FIG. 4B, the mask 8 is patterned using exposure and development if the mask is a photoresist and using reactive ion etching (RIE) or the like with a reactive gas if the mask is a hardmask.

Then, as shown in FIG. 4C, the pattern of the mask 8 is cast on the insulating layer 6 and the spin injection layer (SIL) 3.

For example, etching is performed halfway through the spin injection layer (SIL) by ion milling or RIE with a reactive gas.

Then, as shown in FIG. 4D, the intermediate layer 4 and the field generation layer (FGL) 5 are formed.

Figure 4E:
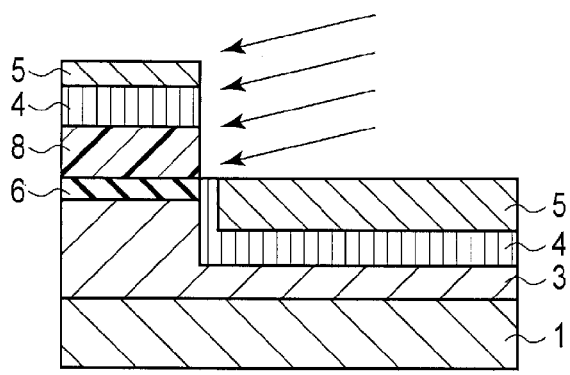

Then, as shown in FIG. 4E, as a preliminary arrangement for a lift-off, the parts of the intermediate layer 4 and the field generation layer (FGL) 5 deposited on the side walls of the photoresist are removed by ion trimming.

Figure 4F:
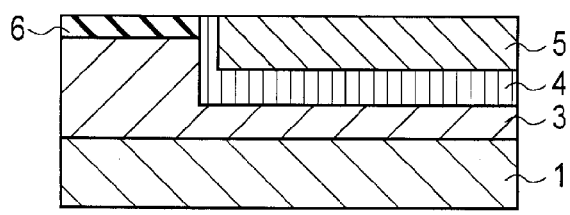

Then, as shown in FIG. 4F, the layered structure is immersed in a solution which dissolves a photoresist and a lift-off is performed thereto to expose the insulating layer 6. The solution may be N-methyl-2-pyrolidone (NMP), for example.

Figure 4G:
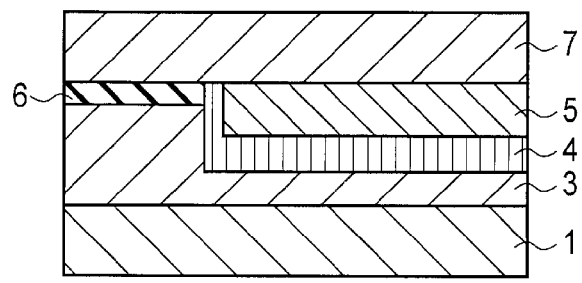

Then, as shown in FIG. 4G, the write shield 7 is formed by plating, sputtering, or the like.

Figure 4H:
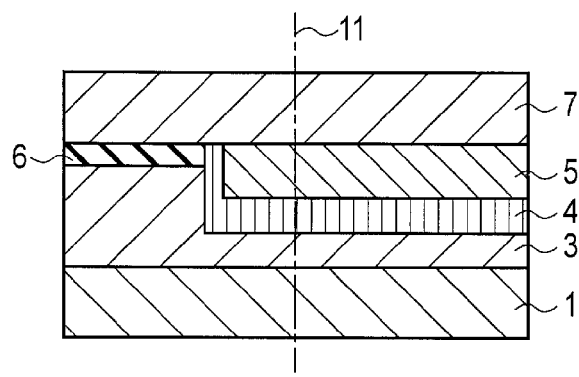
Figure 4I:
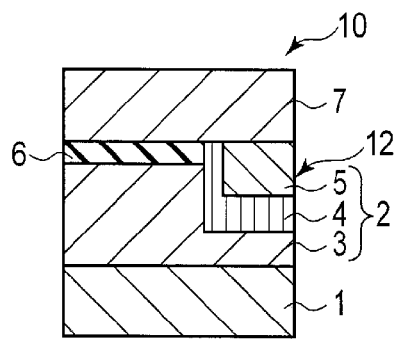

Lastly, as shown in FIG. 4H, rapping is performed along a wave line 11 from the ABS direction to produce a microwave-assisted magnetic recording head of the embodiments as shown in FIG. 4I, which has the same structure as in FIG. 2.

Figure 5:
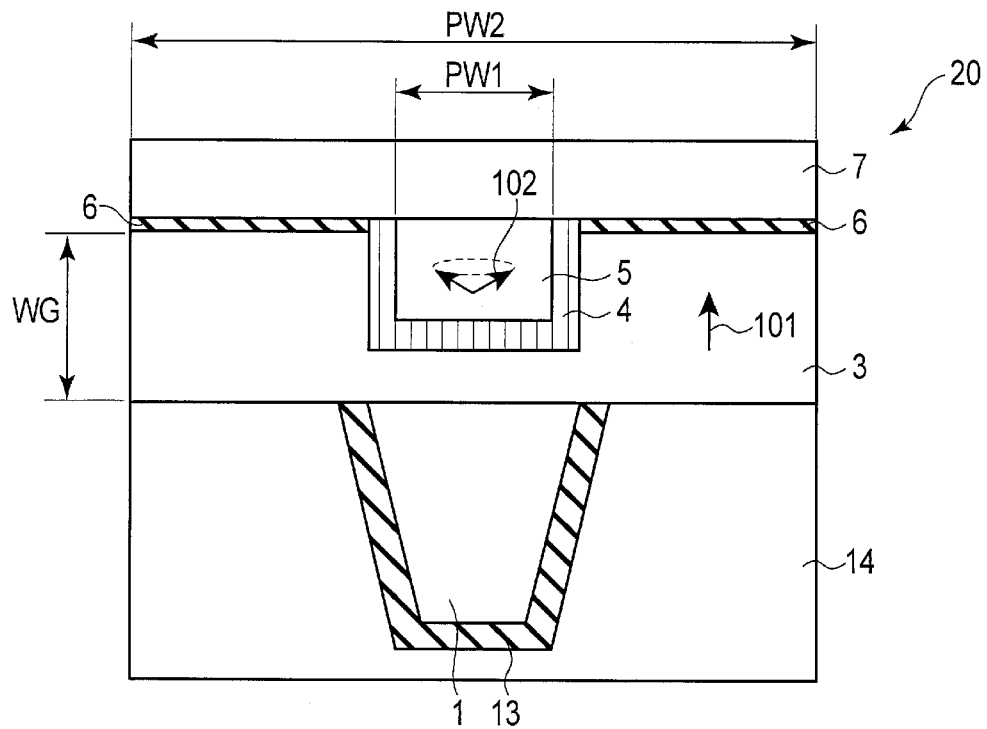
FIG. 5 is a cross-sectional view which schematically shows another example of the microwave-assisted magnetic recording head of the embodiment.

FIG. 5 is a cross-sectional view which schematically shows another structural example of a microwave-assisted magnetic recording head of the fifth embodiment.

FIG. 5 shows the microwave-assisted magnetic recording head 20 of the fifth embodiment at the ABS side.

The structure of a spin torque oscillator 2 used here is based on the second embodiment.

A spin injection layer (SIL) 3 used here has a width PW2 in a direction perpendicular to a write gap WG of an ABS 12, the width PW2 being greater than a width of a field generation layer (FGL) 5 in a direction perpendicular to a write gap WG of an ABS 12, that is, a track width PW1. Furthermore, the spin injection layer (SIL) 3 is at least partially disposed in an area outside the field generation layer (FGL) in the track width direction with an intermediate layer 4 interposed therebetween. The other structure is the same as in FIG. 3.

Figure 6:
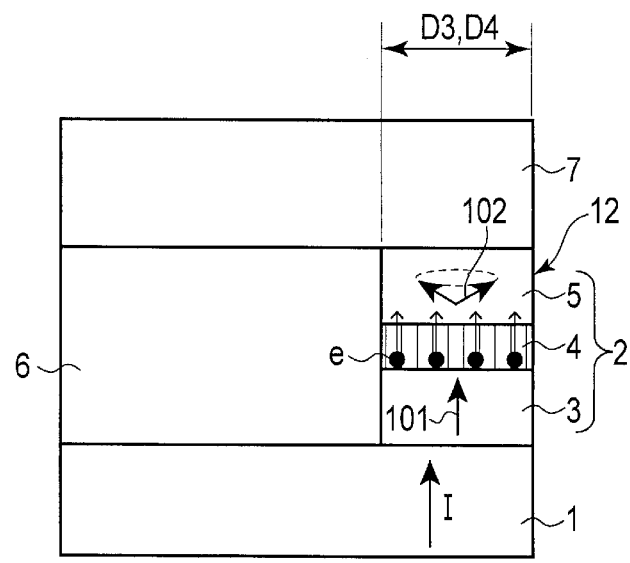
FIG. 6 shows the recording head of FIG. 5 cut perpendicularly to an ABS surface centering a main magnetic pole, as being viewed from a direction perpendicular to the cut surface.

Furthermore, FIG. 6 shows a closer look of an ABS of a recording head cut along a track center of a magnetic disk, as being viewed perpendicularly to the cut surface of the recording head.

As shown, when the microwave-assisted magnetic recording head 20 of the embodiment is viewed from a stripe height direction, a depth D3 of the spin injection layer (SIL) 3 in a direction perpendicular to the write gap WG and the air bearing surface is substantially equal to a depth D4 of the field generation layer (FGL) 5 in a direction perpendicular to the write gap WG and the air bearing surface, and is substantially equal to a depth of the intermediate layer 4 in a direction perpendicular to the write gap WG and the air bearing surface. In this embodiment, the spin injection layer (SIL) 3 is not at all disposed outside the field generation layer (FGL) 5 in the depth direction perpendicular to the air bearing surface. The other structure is the same as in FIG. 1.

The structure of the microwave-assisted magnetic recording head of the sixth embodiment can be obtained using the structure in FIG. 5 as its ABS side structure and the structure in FIG. 2 as its view being viewed from the stripe height direction.

Furthermore, the spin torque oscillator used in the microwave-assisted magnetic recording head of the sixth embodiment is an example of the spin torque oscillator of the third embodiment.

The spin torque oscillator in the microwave-assisted magnetic recording head applies current I since the main magnetic pole and the write shield function as a terminal. Furthermore, by applying an external magnetic field (H) which is perpendicular to a film surface of the spin torque oscillator to a direction of arrow 101 from the main magnetic pole, precession of the field generation layer (FGL) is produced around an axis of rotation substantially perpendicular to the film surface as indicated by arrow 102, and a microwave magnetic field is produced externally. To increase the strength of the microwave magnetic field, the saturation magnetic flux density Bs and the volume (area×film thickness) of the field generation layer (FGL) can be increased. To stably oscillate the field generation layer (FGL), a large amount of polarized electrons can be injected from the spin injection layer (SIL) to the field generation layer (FGL) by using higher energy, that is, increasing current density to be applied thereto. However, use of the increased current density results in an increase of spin transfer torque from the field generation layer (FGL) to the spin injection layer (SIL), and the magnetization of the spin injection layer (SIL) is fluctuated and become unstable. Consequently, the oscillation of the field generation layer (FGL) becomes unstable and a sufficient microwave magnetic field becomes difficult to achieve. Furthermore, high current density which produces Joule heat in the spin torque oscillator and can be used to oscillate a spin torque oscillator with large magnetization Bs and thickness t. The heat causes element diffusion and the like by which the layered structure of the spin torque oscillator collapses, and the spin torque oscillator does not function properly. Thus, the reliability of the spin torque oscillator decreases. There is a proposed structure which will increase the volume of the spin injection layer (SIL) while a possible instability in the magnetization caused by the spin transfer torque from the field generation layer (FGL) is avoided; however, a sufficiently strong microwave magnetic field as desired cannot be obtained from this proposed structure and larger spin transfer torque can be injected to the field generation layer (FGL).

In contrast, in the microwave-assisted magnetic recording head of the embodiment, the spin injection layer (SIL) is formed outside the field generation layer (FGL) in the track width direction, or is formed outside the field generation layer (FGL) in the depth direction perpendicular to the air bearing surface in such a manner that an area between the spin injection layer (SIL) and the field generation layer (FGL) can be enlarged. Within this are, the intermediate layer can be formed with a larger area. Since the area of the intermediate layer contacting the field generation layer (FGL) becomes larger, greater spin transfer torque can be applied to the field generation layer (FGL) and a greater microwave magnetic field can be stably produced.

FIG. 7 is a perspective view which schematically shows essential elements of a magnetic recording and resuming device to which the microwave-assisted magnetic recording head of the embodiment can be mounted.

Specifically, a magnetic recording and resuming device 150 is a device with a rotary actuator mechanism. In the example depicted, a recording medium disk 180 is attached to a spindle 157 and rotates in a direction of arrow A by a motor (not shown) which responds to a control signal from a driver controller (not shown). The magnetic recording and resuming device 150 may comprise a plurality of medium disks 180.

A head slider 103 used for recording and resuming of data stored in the medium disk 180 comprises a magnetic head 10 with the structure as described above with reference to FIGS. 2 and 3. The head slider 103 is attached to a thin-film suspension 154 at its tip. The head slider 103 has the magnetic head of the embodiment at the proximity to its tip, for example.

When the medium disk 180 rotates, the air bearing surface (ABS) of the head slider 103 is maintained apart from the surface of the medium disk 180 with a certain floating height. Or, the slider may be of touch running type to contact with the medium disk 180.

The suspension 154 is connected to one end of the actuator arm 155 including a bobbin which retains a driver coil (not shown). At the other end of the actuator arm 155, a voice coil motor 156 is provided. The voice coil motor 156 is composed of the driver coil (not shown) wound up by the bobbin of the actuator arm 155 and a magnetic circuit including a permanent magnet and an opposite yoke arranged to oppose to each other to sandwich the driver coil.

The actuator arm 155 is held by ball bearings (not shown) provided above and below the spindle 157 and can rotatably slide by the voice coil motor 156.

FIG. 8 schematically shows an example of a magnetic head assembly of the embodiment.

FIG. 8 is a perspective view which shows the magnetic head assembly from the actuator arm 155 onward, as being viewed from the disk side in an enlarged manner. That is, a magnetic head assembly 160 includes, for example, an actuator arm 155 having a bobbin and the like to hold a driver coil and a suspension 154 connected to one end of the actuator 155.

A head slider 103 comprising a magnetic head 10 as shown in, for example, FIGS. 2 and 3 is attached to the tip of the suspension 154. The suspension 154 includes a lead line 164 used to write and read of signals, and the lead line 164 is electrically connected to each terminal of the magnetic head incorporated in the head slider 103. In the example depicted, a reference number 165 is a terminal pad of the magnetic head assembly 160.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A spin torque oscillator comprising:
a spin injection layer having a first side surface;
an intermediate layer having a second side surface formed to be flush with the first side surface; and
a field generation layer formed on the intermediate layer and having a third side surface formed to be flush with the first side surface, wherein the spin torque oscillator has at least one of the following structures:
where a depth of the spin injection layer in a direction perpendicular to the first side surface is greater than a depth of the field generation layer in a direction perpendicular to the third side surface, and the spin injection layer is at least partially disposed in an area outside the field generation layer in the depth direction perpendicular to the third side surface with the intermediate layer interposed therebetween, and
where a width of the spin injection layer in a film surface direction of the first side surface is greater than a width of the field generation layer in a film surface direction of the third side surface, and the spin injection layer is at least partially disposed in an area outside the field generation layer in the film surface direction of the third side surface with the intermediate layer interposed therebetween.

2. A microwave-assisted magnetic recording head, comprising:

a main magnetic pole which applies a magnetic recording field to a magnetic recording medium;

an auxiliary magnetic pole which structures a magnetic circuit with the main magnetic pole; and a spin torque oscillator provided between the main magnetic pole and the auxiliary magnetic pole, wherein the spin torque oscillator includes a spin injection layer formed on either the main magnetic pole or the auxiliary magnetic pole, an intermediate layer formed on the spin injection layer (SIL), and a field generation layer formed on the intermediate layer, and wherein the microwave-assisted magnetic recording head has at least one of the following structures:

where a depth of the spin injection layer in a direction perpendicular to an air bearing surface is greater than a depth of the field generation layer in a direction perpendicular to an air bearing surface, and the spin injection layer is at least partially disposed in an area outside the field generation layer in the depth direction perpendicular to the air bearing surface with the intermediate layer interposed therebetween while being insulated from the auxiliary magnetic pole, and where a width of the spin injection layer in a direction perpendicular to a write gap of the air bearing surface is greater than a width of the field generation layer in a direction perpendicular to a write gap of the air bearing surface, and the spin injection layer is at least partially disposed in an area outside the field generation layer in a track width direction with the intermediate layer interposed therebetween while being insulated from the auxiliary magnetic pole.

3. A magnetic head assembly comprising:

a microwave-assisted magnetic recording head including
a main magnetic pole which applies a magnetic recording field to a magnetic recording medium;
an auxiliary magnetic pole which structures a magnetic circuit with the main magnetic pole; and
a spin torque oscillator provided between the main magnetic pole and the auxiliary magnetic pole, and wherein
the spin torque oscillator includes a spin injection layer formed on either the main magnetic pole or the auxiliary magnetic pole, an intermediate layer formed on the spin injection layer, and a field generation layer formed on the intermediate layer, and wherein the microwave-assisted magnetic recording head has at least one of the following structures:
where a depth of the spin injection layer in a direction perpendicular to an air bearing surface is greater than a depth of the field generation layer in a direction perpendicular to an air bearing surface, and the spin injection layer is at least partially disposed in an area outside the field generation layer in the depth direction perpendicular to the air bearing surface with the intermediate layer interposed therebetween while being insulated from the auxiliary magnetic pole, and
where a width of the spin injection layer in a direction perpendicular to a write gap of the air bearing surface is greater than a width of the field generation layer in a direction perpendicular to a write gap of the air bearing surface, and the spin injection layer is at least partially disposed in an area outside the field generation layer in a track width direction with the intermediate layer interposed therebetween while being insulated from the auxiliary magnetic pole;

a head slider with the microwave-assisted magnetic recording head mounted thereon;

a suspension with the head slider mounted on one end thereof; and an actuator arm connected to the other end of the suspension.

4. A magnetic recording and resuming device, comprising:

a magnetic recording medium;

a driver which rotates the magnetic recording medium; and a microwave-assisted magnetic recording head, including
a main magnetic pole which applies a magnetic recording field to a magnetic recording medium,
an auxiliary magnetic pole which structures a magnetic circuit with the main magnetic pole, and
a spin torque oscillator provided between the main magnetic pole and the auxiliary magnetic pole, wherein
the spin torque oscillator includes a spin injection layer formed on either the main magnetic pole or the auxiliary magnetic pole, an intermediate layer formed on the spin injection layer, and a field generation layer formed on the intermediate layer, and wherein the microwave-assisted magnetic recording head has at least one of the following structures:

where a depth of the spin injection layer in a direction perpendicular to an air bearing surface is greater than a depth of the field generation layer in a direction perpendicular to an air bearing surface, and the spin injection layer is at least partially disposed in an area outside the field generation layer in the depth direction perpendicular to the air bearing surface with the intermediate layer interposed therebetween while being insulated from the auxiliary magnetic pole, and where a width of the spin injection layer in a direction perpendicular to a write gap of the air bearing surface is greater than a width of the field generation layer in a direction perpendicular to a write gap of the air bearing surface, and the spin injection layer is at least partially disposed in an area outside the field generation layer in a track width direction with the intermediate layer interposed therebetween while being insulated from the auxiliary magnetic pole.

\* \* \* \* \*